(12) United States Patent
Parks et al.

(10) Patent No.: US 10,830,385 B2
(45) Date of Patent: Nov. 10, 2020

(54) PIPE INSULATION ASSEMBLY

(71) Applicant: Owens Corning Intellectual Capital, LLC, Toledo, OH (US)

(72) Inventors: Jerry M. Parks, Danville, OH (US); David E. Musick, Heath, OH (US); Jacob T. Chacko, Pickerington, OH (US); Timothy R. Clancy, Swanton, OH (US); Neil Hettler, Granville, OH (US); Weigang Qi, Westerville, OH (US); Madelyn Elizabeth Gutkoski, New Albany, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 143 days.

(21) Appl. No.: 15/774,346

(22) PCT Filed: Nov. 11, 2016

(86) PCT No.: PCT/US2016/061462
§ 371 (c)(1),
(2) Date: May 8, 2018

(87) PCT Pub. No.: WO2017/083603
PCT Pub. Date: May 18, 2017

(65) Prior Publication Data
US 2019/0331286 A1    Oct. 31, 2019

Related U.S. Application Data

(60) Provisional application No. 62/254,670, filed on Nov. 12, 2015, provisional application No. 62/268,027, (Continued)

(51) Int. Cl.
*F16L 59/14* (2006.01)
*F16L 59/02* (2006.01)

(52) U.S. Cl.
CPC ............. *F16L 59/14* (2013.01); *F16L 59/022* (2013.01); *F16L 2201/60* (2013.01)

(58) Field of Classification Search
CPC ... F16L 59/022; F16L 2201/60; Y10T 428/14; Y10S 138/01
(Continued)

(56) References Cited

U.S. PATENT DOCUMENTS 3,092,530 A * 6/1963 Plummer ................ F16L 59/10
138/151
4,022,248 A * 5/1977 Hepner ................ F16L 59/023
138/141
(Continued)

FOREIGN PATENT DOCUMENTS

CN    1555471 A    12/2004

OTHER PUBLICATIONS

International Search Report and Written Opinion in PCT/US2016/061462 dated Mar. 7, 2017.
(Continued)

*Primary Examiner* — Patrick F Brinson
(74) *Attorney, Agent, or Firm* — Calfee, Halter & Griswold LLP

(57) ABSTRACT

Pipe insulation assemblies (10) comprising tubular insulation (100) having a longitudinal slit (400), a jacket (110), releasable tape (120), butt sealant strips (600), and/or closing adhesives are disclosed. The jacket (110) overlays the outer surface of the tubular insulation (100). The jacket (110) has an extended lip portion (200) extending beyond the longitudinal slit (400). An adhesive (420) and an internal release liner (130) are located on the extended lip portion (200).

12 Claims, 28 Drawing Sheets

Related U.S. Application Data filed on Dec. 16, 2015, provisional application No. 62/287,812, filed on Jan. 27, 2016.

(58) Field of Classification Search
USPC .......... 138/149, 104, 128, 151, 156, DIG. 1; 33/483, 755; 428/40.1, 40.4, 40.9
See application file for complete search history.

(56) References Cited

U.S. PATENT DOCUMENTS

| | | | |
|---|---|---|---|
| 4,584,217 A * | 4/1986 | McClintock | C09J 5/10 428/41.8 |
| 4,605,043 A * | 8/1986 | Grenier | F16L 59/022 138/149 |
| 4,946,732 A * | 8/1990 | Cohen | F16L 59/10 428/192 |
| 5,069,969 A | 12/1991 | McClintock et al. | |
| 5,141,793 A | 8/1992 | Fontanilla | |
| 5,421,371 A * | 6/1995 | Lauer | F16L 59/022 138/110 |
| 5,697,282 A | 12/1997 | Schakel et al. | |
| 5,730,822 A | 3/1998 | Robertson et al. | |
| 5,736,211 A * | 4/1998 | Fontanilla | B32B 7/12 428/40.1 |
| 5,855,154 A | 1/1999 | Schakel et al. | |
| 5,947,158 A | 9/1999 | Gross et al. | |
| 5,964,252 A * | 10/1999 | Simmons | F16L 59/022 138/128 |
| 6,000,437 A | 12/1999 | Ponder et al. | |
| 6,214,143 B1 | 4/2001 | Robertson et al. | |
| 6,231,927 B1 | 5/2001 | Ruid | |
| 6,432,482 B1 | 8/2002 | Jaffee et al. | |
| 6,723,670 B2 | 4/2004 | Kajander et al. | |
| 6,769,455 B2 | 8/2004 | Toas et al. | |
| 6,782,922 B1 | 8/2004 | Migliorini et al. | |
| 6,797,653 B2 | 9/2004 | Fay | |
| 6,843,279 B1 * | 1/2005 | Ungemah | F16L 59/022 138/104 |
| 6,964,282 B2 | 11/2005 | Babineau, Jr. et al. | |
| 6,986,367 B2 | 1/2006 | Toas et al. | |
| 7,159,620 B2 | 1/2007 | Kissell | |
| 7,220,470 B2 | 5/2007 | Toas et al. | |
| 7,223,455 B2 | 5/2007 | Ruid et al. | |
| 7,279,438 B1 | 10/2007 | Ruid et al. | |
| 7,351,459 B2 | 4/2008 | Fay et al. | |
| 7,393,427 B2 | 7/2008 | Bright | |
| 7,462,259 B2 | 12/2008 | Kajander et al. | |
| 7,662,249 B2 | 2/2010 | Bright | |
| 7,749,923 B2 | 7/2010 | Moore et al. | |
| 7,754,122 B2 | 7/2010 | Fay | |
| 7,803,725 B2 | 9/2010 | Payne et al. | |
| 8,104,311 B2 | 1/2012 | Baker et al. | |
| 8,104,519 B1 | 1/2012 | Shumate et al. | |
| 8,110,512 B2 | 2/2012 | Moore et al. | |
| 8,141,594 B2 | 3/2012 | Shumate et al. | |
| 8,187,418 B2 | 5/2012 | Kajander et al. | |
| 2006/0000104 A1 | 1/2006 | Patton | |
| 2007/0256365 A1 * | 11/2007 | Petty | F16L 59/021 49/473 |
| 2009/0308476 A1 | 12/2009 | DeMartino et al. | |

OTHER PUBLICATIONS

Office Action from CN Application No. 201680075042.9 dated Jul. 1, 2019.

Office Action from CN Application No. 201680075042.9 dated Mar. 3, 2020.

Office Action from CN Application No. 201680075042.9 dated Sep. 2, 2020.

* cited by examiner

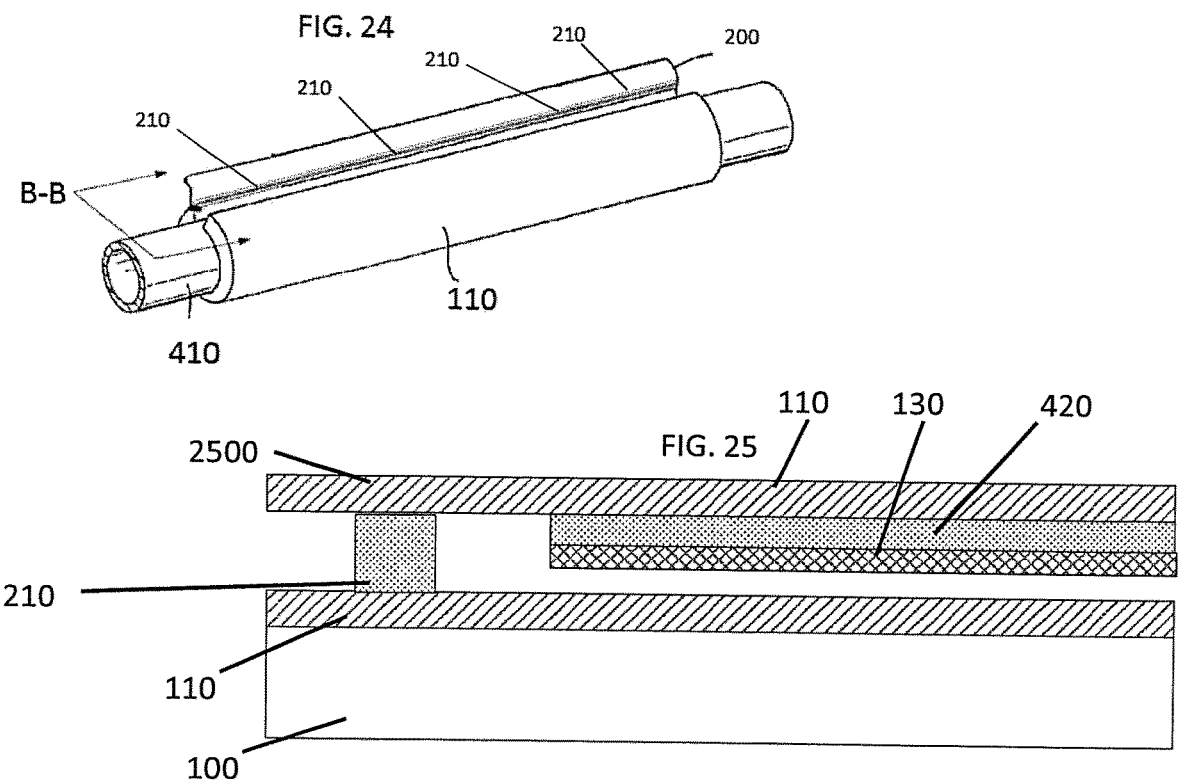

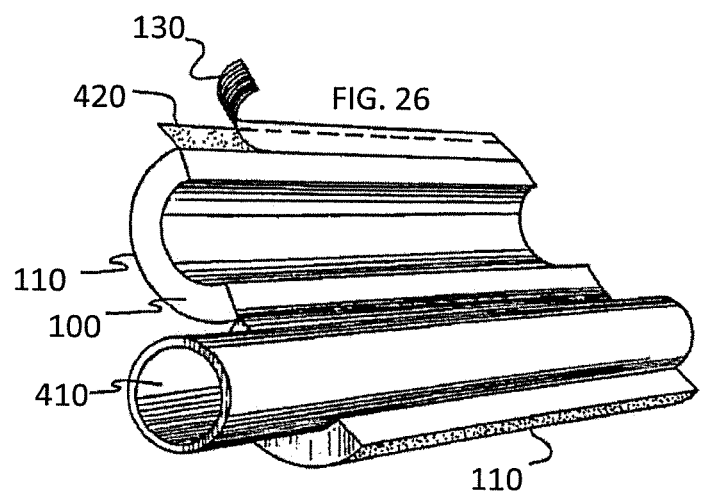
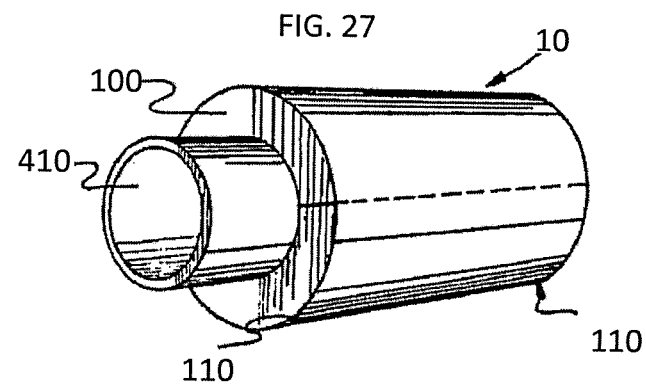

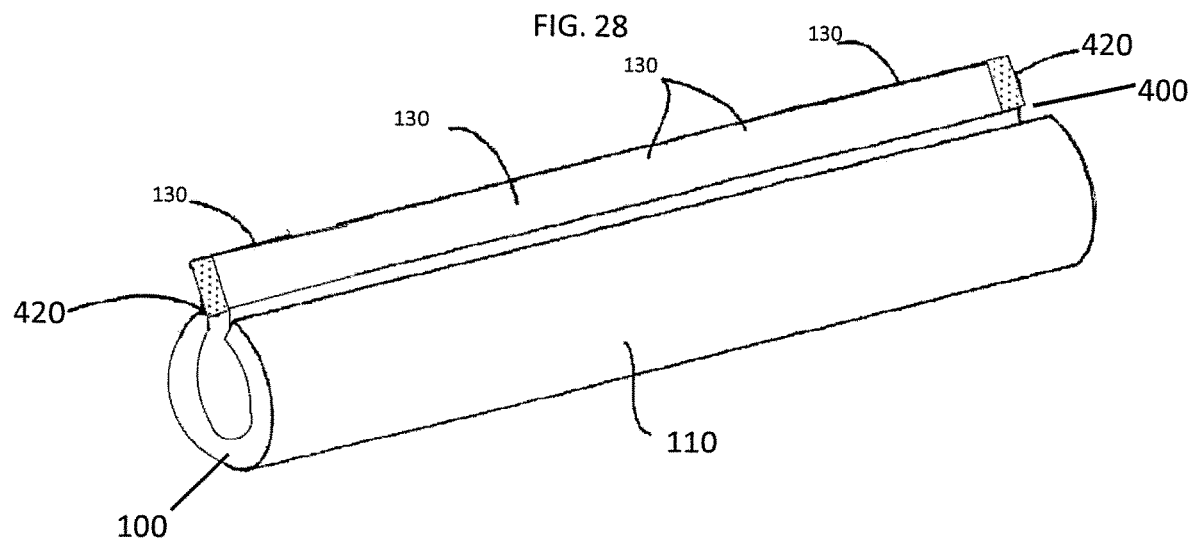

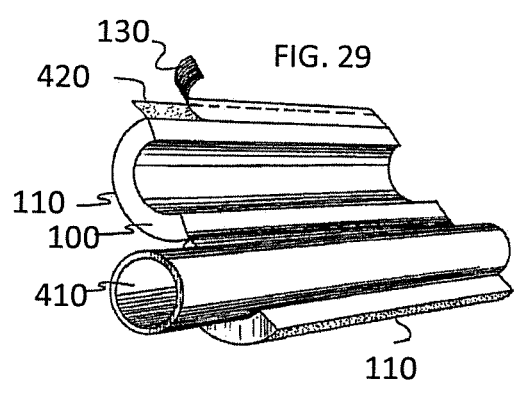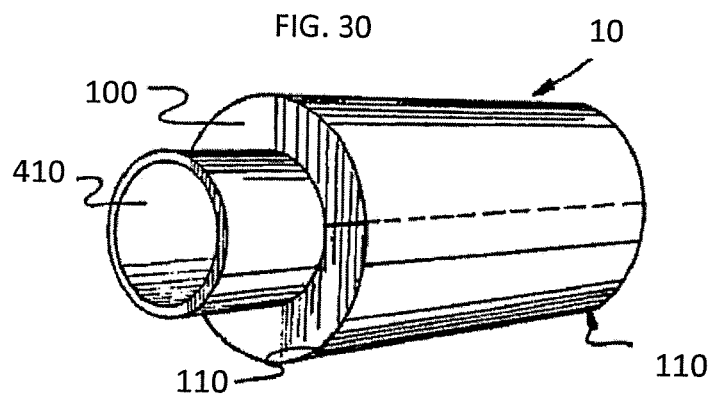

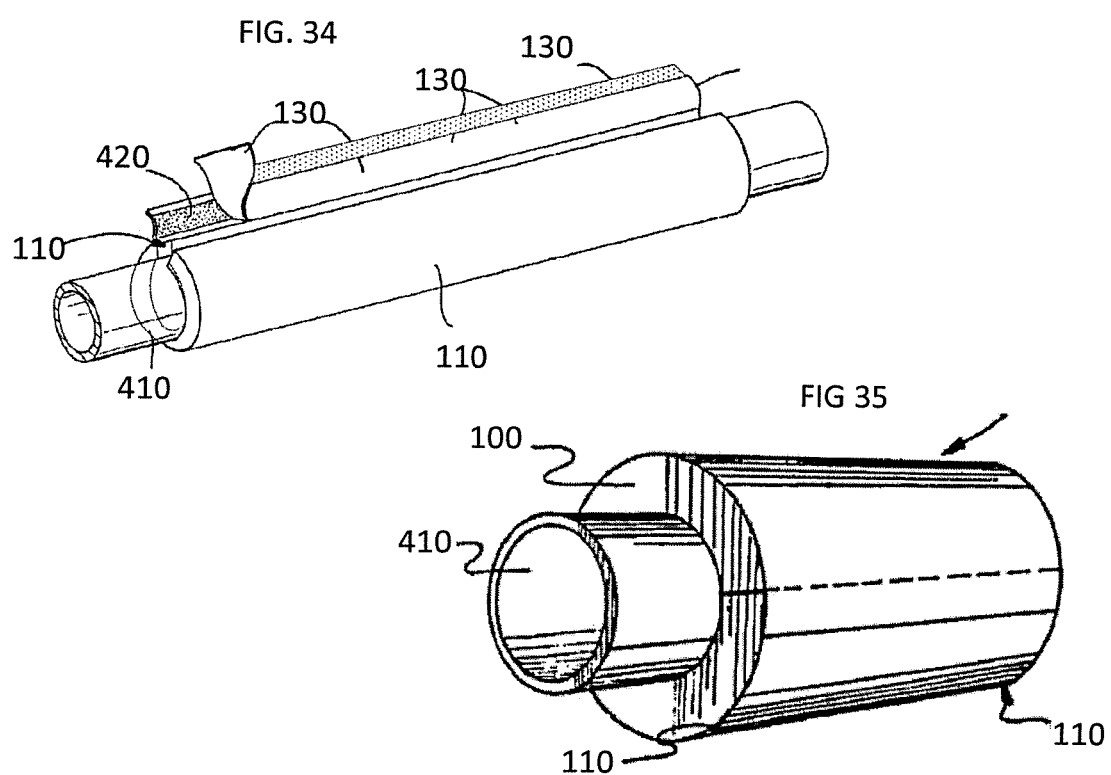

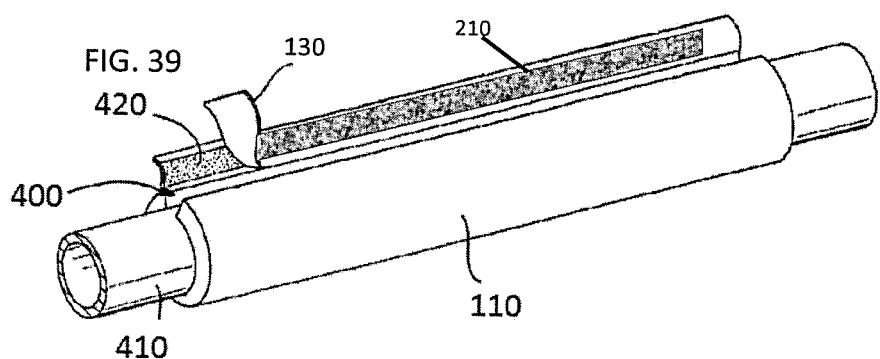
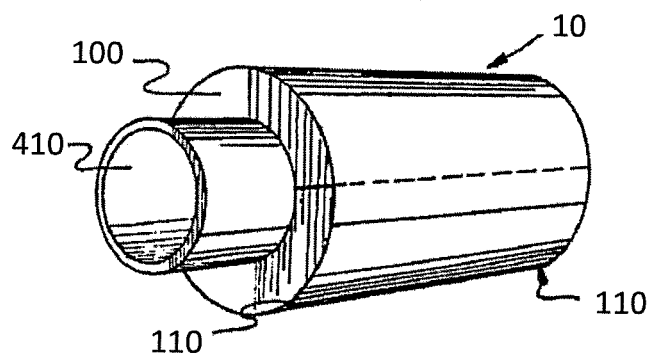

PIPE INSULATION ASSEMBLY

RELATED APPLICATIONS

This application is the U.S. national stage entry of PCT/US16/61462, filed on Nov. 11, 2016, which claims priority to and all benefit of U.S. Provisional Patent Application Ser. No. 62/254,670, filed on Nov. 12, 2015, for PIPE INSULATION ASSEMBLY, U.S. Ser. No. 62/268,027, filed on Dec. 16, 2015 for PIPE INSULATION ASSEMBLY and U.S. Ser. No. 62/287,812, filed on Jan. 27, 2016 for PIPE INSULATION ASSEMBLY, the entire disclosures of which are fully incorporated herein by reference.

TECHNICAL FIELD

The present invention relates to pipe insulation assembly that can be used to insulate piping and equipment.

BACKGROUND

The subject invention relates to a pipe insulation assembly that includes a length of tubular insulation with a longitudinally extending slit so that the tubular insulation can be passed over and mounted on a length of pipe. The pipe insulation assembly typically includes a jacket overlaying the outer surface of the tubular insulation. The jacket overlaying the outer surface of the tubular insulation has an extended lip portion on which an adhesive and internal release liner are usually placed. After the insulation and jacket are placed over a pipe the slit is then closed using the lip portion, removing the internal release liner in the lip portion and exposing the adhesive. The lip portion is then secured to the jacket, thus securing the insulation assembly to the pipe. Prior to installation of the pipe insulation assembly to the pipe, the lip portion can become damaged during shipping and warehousing.

SUMMARY

The present application discloses exemplary embodiments of pipe insulation assembly. By way of example to illustrate various aspects of the general inventive concepts, several exemplary embodiments of insulation assemblies and methods are disclosed herein.

In an exemplary embodiment, the present disclosure is directed to a pipe insulation assembly comprising tubular insulation having a longitudinal slit, a jacket, and a releasable tape. The jacket overlays the outer surface of the tubular insulation. The jacket has an extended lip portion extending beyond the longitudinal slit. An adhesive and an internal release liner are located on the extended lip portion. The releasable tape is at least partially disposed over the lip portion. The releasable tape has a releasable adhesive attached to an underside of the tape and dimensional markings located on an upper side of the tape. The dimensional markings are visible outside the jacket.

In an exemplary embodiment, the present disclosure is directed to a pipe insulation assembly comprising a tubular insulation having a longitudinal slit, a jacket overlaying the outer surface of the tubular insulation, and a butt sealant strip. The jacket has an extended lip portion extending beyond the longitudinal slit. An adhesive and an internal release liner are located on the extended lip portion. The butt sealant strip has opposing ends. The butt sealant strip is at least partially disposed over the lip portion. A portion of an adhesive of the butt sealing strip is exposed or a closing adhesive is applied to at least one of the opposing ends of the butt sealant strip.

In an exemplary embodiment, the butt sealant strip is wrapped circumferentially around the jacket and the butt sealant strip is held in place by the exposed adhesive or by the closing adhesive.

In an exemplary embodiment, the butt sealant strip is applied longitudinally over at least part of the lip portion and the exposed adhesive or the closing adhesive attaches the butt sealant strip to the jacket.

In an exemplary embodiment, the present disclosure is directed to a pipe insulation assembly comprising tubular insulation having a longitudinal slit, a jacket overlaying the outer surface of the tubular insulation, and at least one bead or a dot of closing adhesive located on the internal release liner. The jacket has an extended lip portion extending beyond the longitudinal slit. A side of the extended lip portion is coated with an adhesive. An internal release liner covers the adhesive on the lip portion.

In an exemplary embodiment, the present disclosure is directed to a pipe insulation assembly comprising tubular insulation having a longitudinal slit, a jacket overlaying the outer surface of the tubular insulation, and a closing adhesive. The jacket has an extended lip portion extending beyond the longitudinal slit. A side of the extended lip portion is coated with an adhesive and an internal release liner covers the adhesive. A closing adhesive is located on the extended lip portion and is adjacent to the internal release liner such that the closing adhesive contacts the tubular insulation when the jacket is closed.

In an exemplary embodiment, the present disclosure is directed to a pipe insulation assembly comprising tubular insulation having a longitudinal slit, a jacket overlaying the outer surface of the tubular insulation, an adhesive located on a side of the extended lip portion, and an internal release liner partially covering the adhesive leaving a portion of the adhesive exposed. The jacket has an extended lip portion extending beyond the longitudinal slit. The exposed portion of the adhesive contacts an opposing end of the jacket when the jacket is closed.

In an exemplary embodiment, the present disclosure is directed to a pipe insulation assembly comprising tubular insulation having a longitudinal slit, a jacket overlaying the outer surface of the tubular insulation, an internal release liner attached to the extended lip portion and positioned so that a portion of the internal release liner reaches beyond the extended lip portion, an adhesive located on a side of the internal release liner that is attached to the extended lip portion, and a closing adhesive located on a second side of the second lip. The jacket has an extended lip portion extending beyond the longitudinal slit. An edge of the internal release liner is adjacent to an edge of the extended lip portion forming a second lip.

In an exemplary embodiment, a first side of the second lip is exposed when the jacket is closed.

In an exemplary embodiment, the exposed first side of the second lip has dimensional markings that are visible outside the jacket when the jacket is closed.

BRIEF DESCRIPTION OF THE DRAWINGS

FIG. 24 is a perspective view of another embodiment of a pipe insulation assembly according to the present invention;

FIG. 25 is a cross-section view from line B-B of FIG. 24 when the lip portion is closed;

FIG. 26 is a perspective view showing the pipe insulation assembly in an open position with a pipe in one section thereof, an exposed lip adhesive and the partial removal of the internal release liner in a lip portion of the jacket;

FIG. 27 is a perspective view showing the insulation jacket in a closed position about a pipe where the lip portion of the jacket has been bonded to the other longitudinal portion of the jacket;

FIG. 28 is a perspective view of another embodiment of a pipe insulation assembly according to the present invention;

FIG. 29 is a perspective view showing the pipe insulation assembly in an open position with a pipe in one section thereof, an exposed lip adhesive and the partial removal of the internal release liner in a lip portion of the jacket;

FIG. 30 is a perspective view showing the insulation jacket in a closed position about a pipe where the lip portion of the jacket has been bonded to the other longitudinal portion;

FIG. 34 is a perspective view showing the insulation jacket of FIG. 31; and

FIG. 35 is a perspective view showing the insulation jacket in a closed position about a pipe where the lip portion of the jacket has been bonded to the other longitudinal portion.

FIG. 39 is a perspective view of the pipe insulation assembly of FIG. 36 illustrating the removability of a release liner and closing adhesive.

FIG. 40 is a perspective view of the pipe insulation assembly of FIG. 36 installed on a pipe.

DETAILED DESCRIPTION

Figure 1:
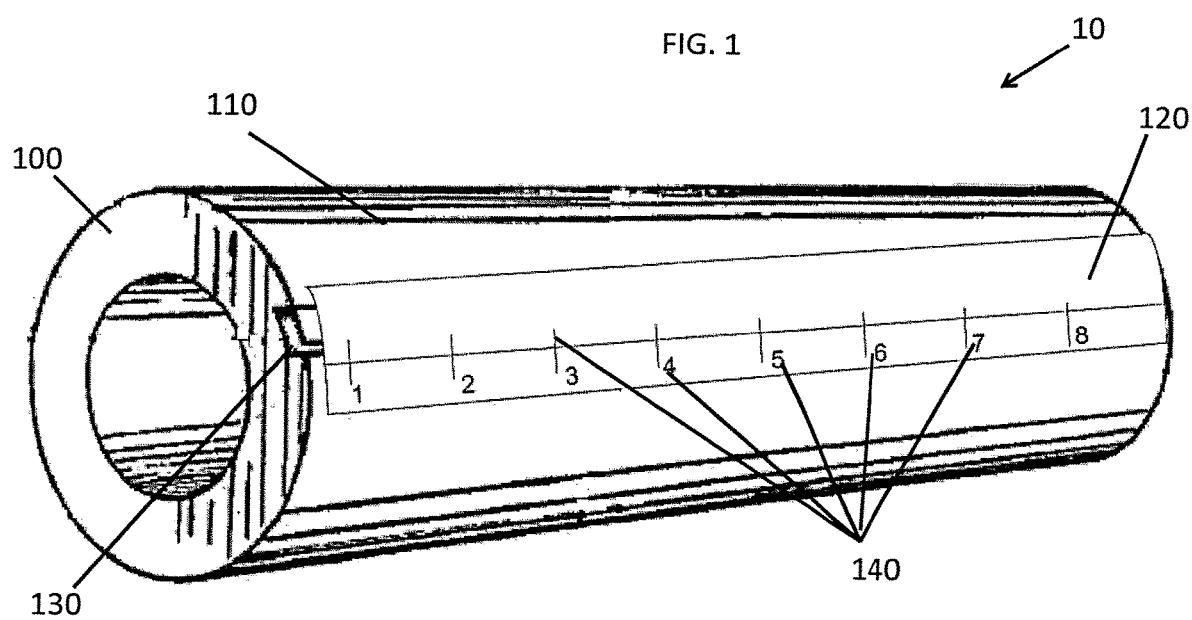
FIG. 1 is a perspective view of one embodiment of a pipe insulation assembly according to the present invention.

According to the concepts of the present invention, a pipe insulation assembly that can be used to insulate piping and equipment is disclosed. The pipe insulation assembly is constructed to temporarily join ends of the jacket together until a permanent bond is desired. The pipe insulation assembly has a length of tubular insulation. The tubular insulation may be made of various materials, including fiberglass, foam, vacuum insulated panel (VIP), foam glass, and/or mineral wool. The pipe insulation assembly also includes a longitudinally extending slit so that the tubular insulation can be passed over and mounted on a length of pipe and a jacket overlaying the outer surface of the tubular insulation.

The jacket overlaying the outer surface of the tubular insulation has an extended lip portion on which an adhesive and internal release liner are usually placed. The jacket may be made of various materials, including standard all surface jacketing (ASJ), WMP-ASJ, polypropylene, polyethylene, polyethylene terephthalate (PET), polyvinyl chloride (PVC), and/or nylon. The adhesive and internal release liner may be a Self Sealing Lap (SSL) Closure. The Self Sealing Lap may be made of various materials, including Fasson FLE, acrylic adhesive coated on both sides of a PET carrier self wound on a silicone coated tissue carrier release. An Amorphous Poly-Olefin (APO/APAO)-based Hot Melt Adhesive, polyamide (PA) Hot Melt, or various other types of hot melts may be used to secure the jacket to the outer surface of the tubular insulation, as well as various other adhesives. A closing adhesive may be used to temporarily hold the lip portion in place during warehousing, shipping, or other stages prior to the permanent placement of the pipe insulation assembly on a pipe. The closing adhesive may be made of various types of materials including Amorphous Poly-Olefin (APO/APAO)-based Hot Melt Adhesive, polyamide (PA) Hot Melt, or various other types of hot melts. After the insulation and jacket are placed over a pipe the slit is then closed using the lip portion, removing the internal release liner of the Self Sealing Lap in the lip portion and exposing the adhesive. The lip portion is then secured to the jacket, thus securing the insulation assembly to the pipe.

Several embodiments of the inventive pipe insulation assembly are disclosed herein which prevent or minimize damage that the lip portion can experience during shipping and warehousing.

In an exemplary embodiment, the pipe insulation assembly has an insulation material, a jacket surrounding the insulation material, and a releasable tape, such as a pressure sensitive tape.

The longitudinally extending slit in the insulation material allows the tubular insulation to be passed over and mounted on a length of pipe. A releasable tape can be used as a temporary closure for the pipe insulation assembly. The releasable tape is at least partially disposed over the lip portion. The releasable tape has a releasable adhesive attached to an underside of the tape. The releasable tape may be made of various materials including, longitudinal painter's tape, 3M safe release edge lock tape, low energy or various other types of temporary tapes.

Dimensional markings and/or angle markings can be placed on an upper side of the tape, so that the markings are visible outside the jacket. In certain embodiments, the dimensional and/or angle marking may be placed on the jacket that overlays the outer surface of the tubular insulation. These dimensional and/or angle markings can take various forms, including a ruler, inches, centimeters, meters, etc. This provides a visible ruler to assist a contractor with cutting the insulation article, when smaller lengths or sections of insulation are needed. A ruler for measuring the length of pipe insulation section(s) made by transversely cutting the pipe insulation assembly is formed by easily visible markings, in units of linear measurement, printed or otherwise formed on the release tape. The dimensional markings may be English system units, any portion of an English unit (e.g. inch or half inch increments) metric units (e.g. centimeter increments), or any portion of a metric unit. In certain embodiments, the dimensional and/or angle markings are made with an ink that is invisible unless a special light or special glasses are used. The dimensional and/or angle markings may be made using an ultraviolet (UV) ink that is not visible or nearly invisible using ordinary white light (e.g., UV ink that is only visible under ultraviolet light). The use of invisible ink maintains the finished pipe appearance under normal light, but marks the dimensions and/or angles when special light is used during installation. This saves the step of measuring with a separate measuring tool, thus saving the installer time, money and reducing the amount of incorrectly measured product.

In an exemplary embodiment, the pipe insulation assembly has an insulation material, a jacket surrounding the insulation material, and a butt sealant strip. The jacket surrounds the insulation material and has a lip portion extending beyond the longitudinal slit in the insulation material. Upon installation the lip portion of the jacket can be bonded to another portion of the jacket.

The construction of a butt sealant strip is well known in the art. The butt sealant strip has opposing ends. It has a release liner and an adhesive. Various other forms of attachment band may be used in place of a convention butt sealant strip. However, the modified butt sealant strip or attachment band of the current description has a closing adhesive applied to an opposing end of the butt sealant strip or a portion of the butt sealant strip is exposed or can be easily exposed. The improved butt sealant strip may have a closing adhesive applied to both opposing ends or a portion of the adhesive of the butt sealing strip may be exposed or can be easily exposed at both opposing ends. The closing adhesive may take various forms, including an easy release tape applied to hold the back side of the butt sealant strip to the lip portion area of the jacket.

The butt sealant strip is at least partially disposed over the lip portion of the jacket. The butt sealant strip may be wrapped circumferentially around the jacket. In this configuration the butt sealant strip is held in place by the closing adhesive at one of the opposing ends or by an exposed portion of the adhesive of the butt sealing strip. In certain embodiments, the butt sealant strip may be applied longitudinally over at least part of the lip portion. In this configuration, the exposed adhesive or closing adhesive is located at both opposing ends and can be used to attach the butt sealant strip to the jacket. The closing adhesive may take various forms, including an easy release tape applied to hold the back side of the butt sealant strip.

Figure 2:
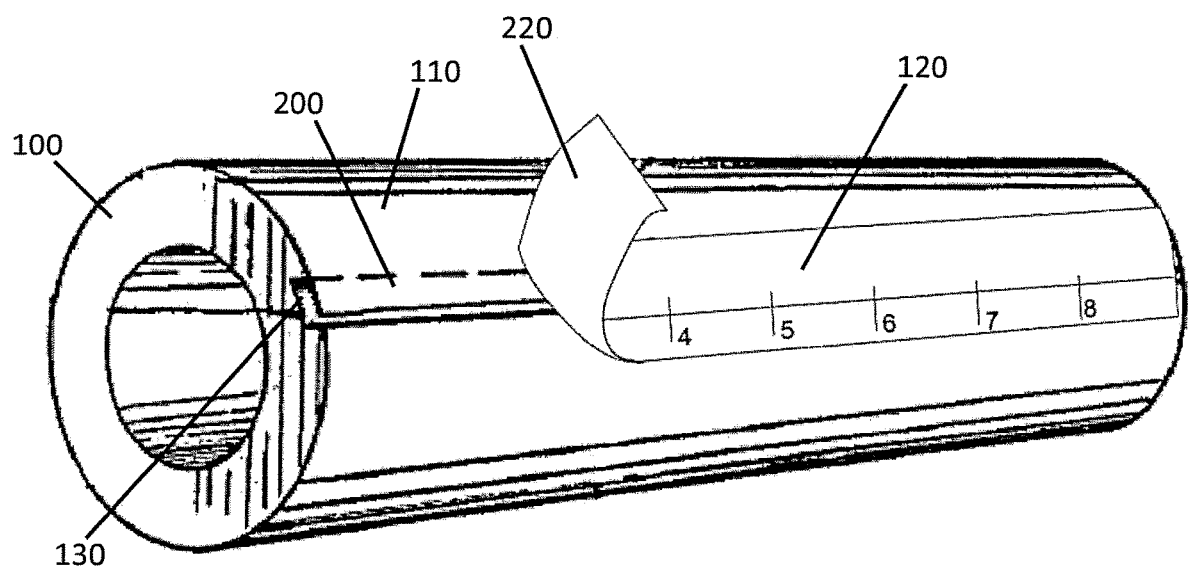
FIG. 2 is a perspective view of the pipe insulation assembly of FIG. 1 showing the partial removal of a temporary closing tape.
Figure 3:
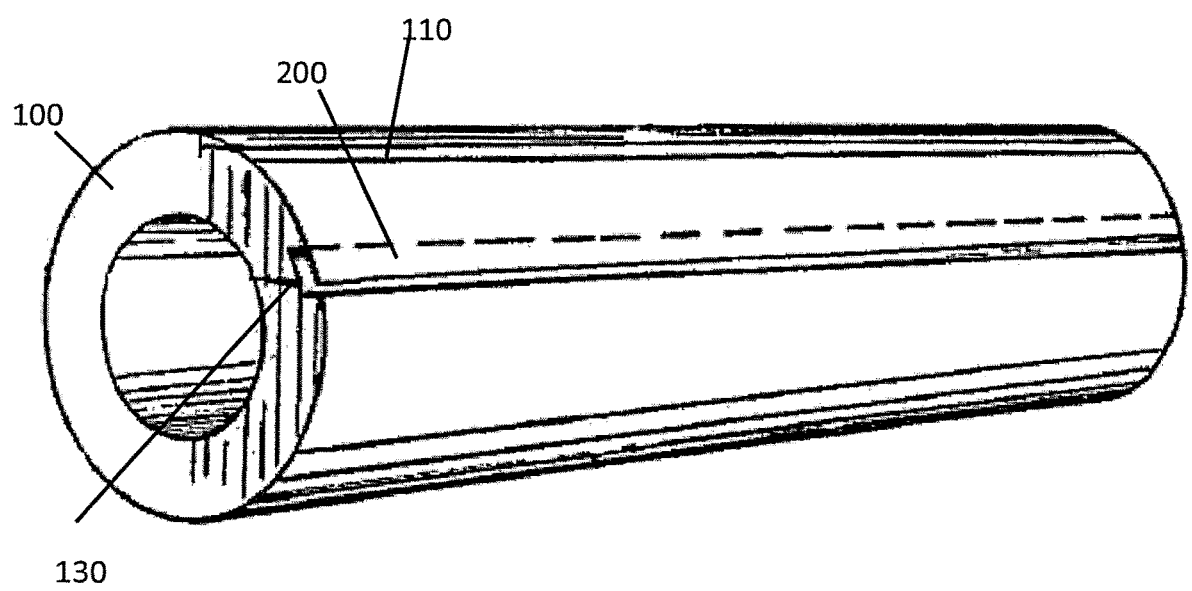
FIG. 3 is a partial perspective view of the pipe insulation assembly with temporary closing tape removed.
Figure 4:
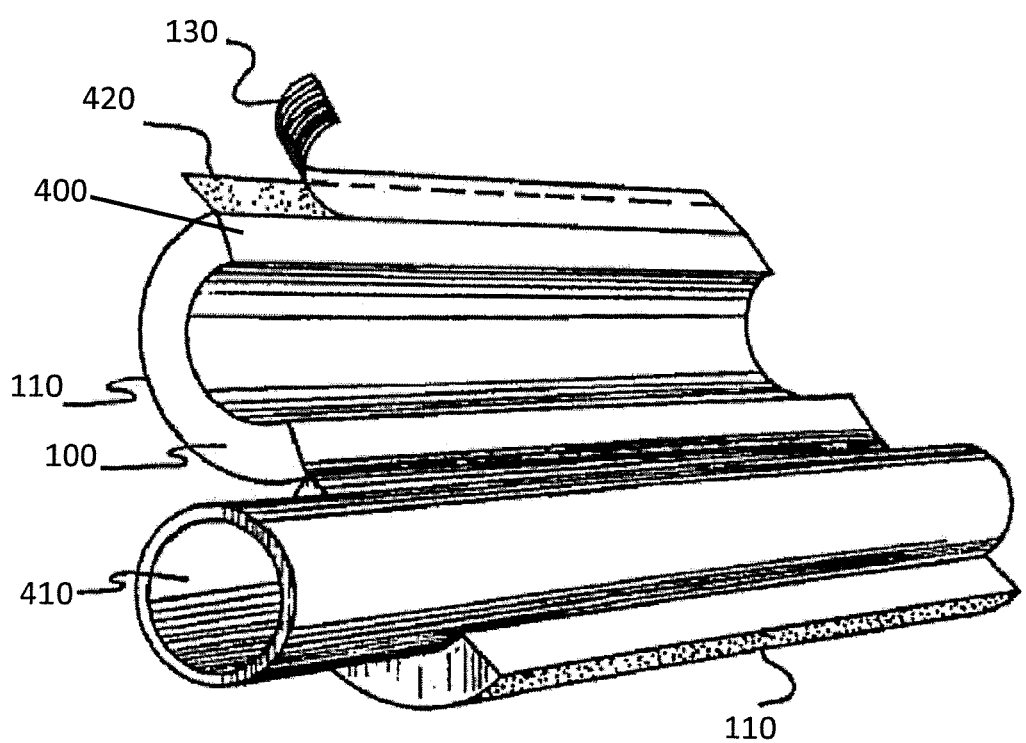
FIG. 4 is a perspective view showing the pipe insulation assembly in an open position with a pipe in one section thereof, an exposed lip adhesive and the partial removal of the internal release liner in a lip portion of the jacket.
Figure 5:
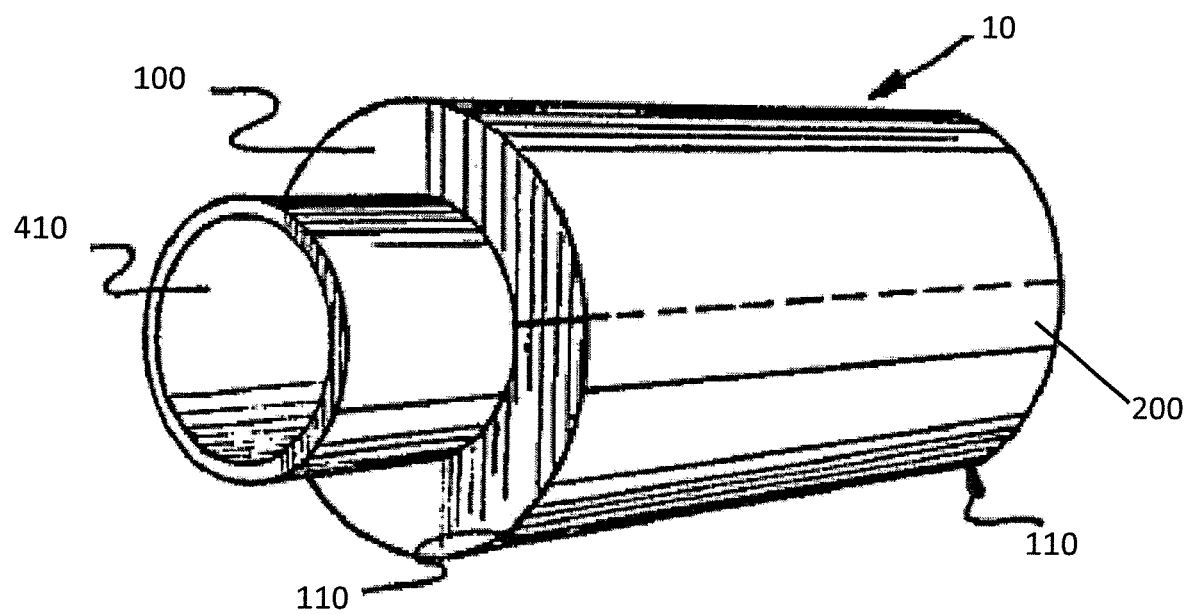
FIG. 5 is a perspective view showing the insulation jacket in a closed position about a pipe where the lip portion of the jacket has been bonded to the other longitudinal portion of the jacket.
Figure 6:
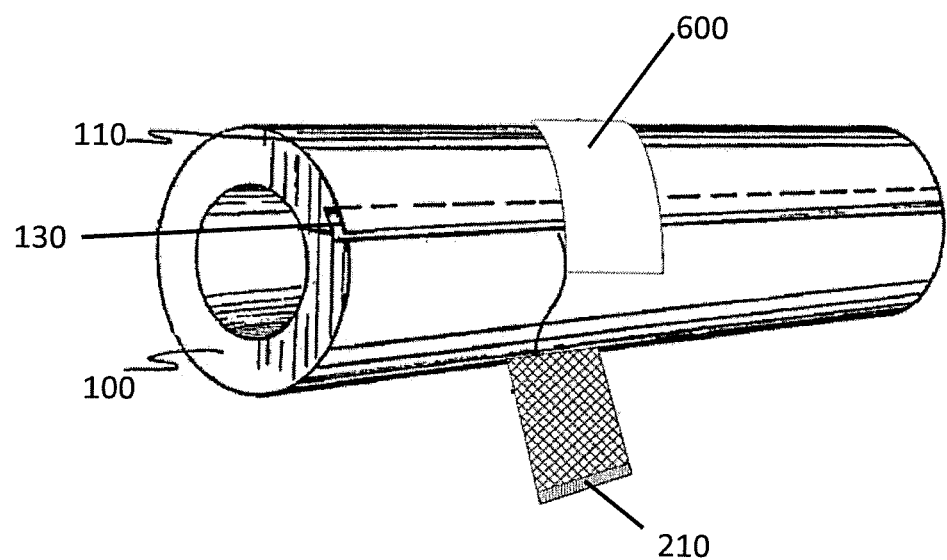
FIG. 6 is a perspective view of another embodiment of a pipe insulation assembly according to the present invention.

Referring now to FIGS. 1-5, in an exemplary embodiment, the pipe insulation assembly (10) comprises tubular insulation (100) having a longitudinal slit (400), a jacket (110), and a releasable tape (120). The jacket (110) overlays the outer surface of the tubular insulation (100). The jacket (110) has an extended lip portion (200) (see FIG. 2) extending beyond the longitudinal slit (400). Referring to FIGS. 3-4, adhesive (420) and an internal release liner (130) are located on the extended lip portion (200). The releasable tape (120) is at least partially disposed over the extended lip portion (200). Referring to FIG. 2, the releasable tape (120) has a releasable adhesive (220) attached to an underside of the tape along with dimensional markings (140) and/or angle markings (not shown) located on an upper side of the tape. The dimensional markings (140) and/or angle markings are placed on an upper side of the tape outside the jacket (110). In certain embodiments, the dimensional and/or angle markings may be placed on the jacket that overlays the outer surface of the tubular insulation. The dimensional markings (140) may be English system units, any portion of an English unit (e.g. inch or half inch increments) metric units (e.g. centimeter increments), or any portion of a metric unit. In certain embodiments, the dimensional and/or angle markings (140) are made with an ink that is invisible unless a special light or special glasses are used. The dimensional and/or angle markings may be made using an invisible ink or a nearly invisible ink (e.g., UV ink that is only visible under ultraviolet light).

The releasable tape (120) can be made of a variety of materials, including longitudinal painters tape like 3M safe release edge lock tape, low energy tape, or any variety of painters tape or temporary tape. When the releasable tape (120) is removed as indicated in FIG. 2-5, the extended lip portion (200) is exposed. The longitudinally extending slit (400) is used to place the tubular insulation (100) over a length of pipe, thus mounting the insulation to the pipe (410). After the tubular insulation (100) and jacket (110) are placed over the pipe (410), the longitudinal slit (400) is then closed using the lip portion (200), removing the internal release liner (130) in the lip portion (200) and exposing the adhesive (420). The extended lip portion (200) is then secured to the jacket (110), thus securing the insulation assembly to the pipe (410).

Referring now to FIGS. 6-12, in an exemplary embodiment, a pipe insulation assembly (10) comprises a tubular insulation (100) having a longitudinal slit (400), a jacket (110) overlaying the outer surface of the tubular insulation (100), and a butt sealant strip (600). The jacket (110) has an extended lip portion (200) extending beyond the longitudinal slit (400). An adhesive (420) and an internal release liner (130) are located on the extended lip portion (200). The butt sealant strip (600) has opposing ends. The butt sealant strip (600) is at least partially disposed over the extended lip portion (200). Reference character 210 represents either an exposed portion of an adhesive of the butt sealant strip. A remainder of the adhesive is covered by a release liner (130) in FIG. 6 or a temporary adhesive. The exposed adhesive or closing adhesive (210) is located on at least one of the opposing ends of the butt sealant strip (600).

Figure 7:
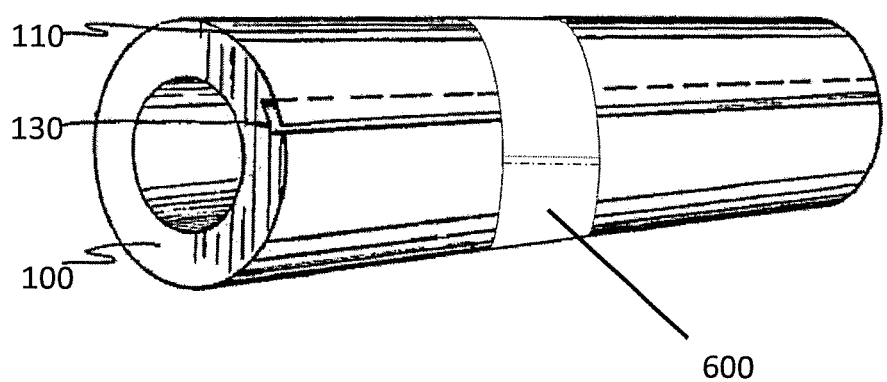
FIG. 7 is a perspective view of the pipe insulation assembly of FIG. 6 showing a portion of the butt sealant strip attached to another portion of the butt sealant strip.
Figure 8:
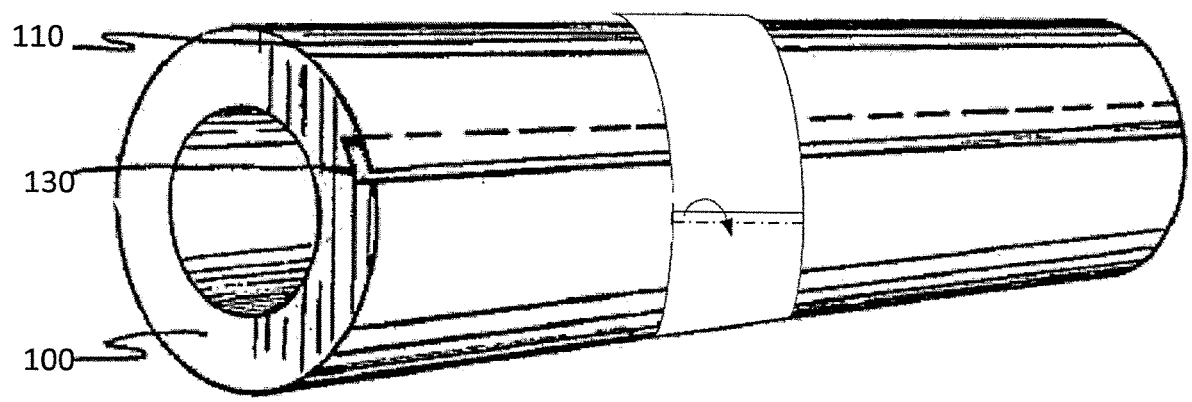
FIG. 8 is a perspective view of the pipe insulation assembly of FIG. 6.
Figure 9:
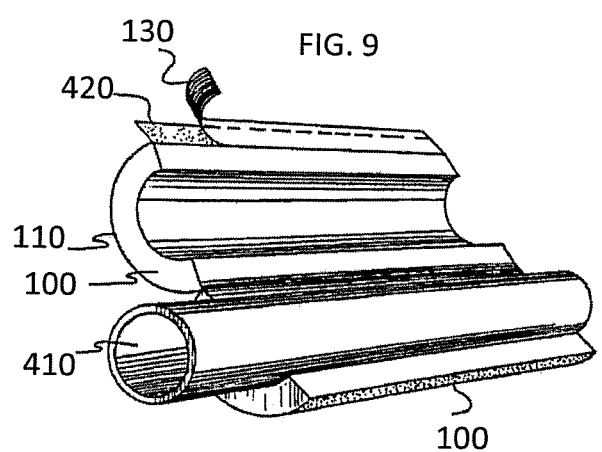
FIG. 9 is a perspective view showing the pipe insulation assembly in an open position with a pipe in one section thereof, an exposed lip adhesive and the partial removal of the internal release liner in a lip portion of the jacket.
Figure 10:
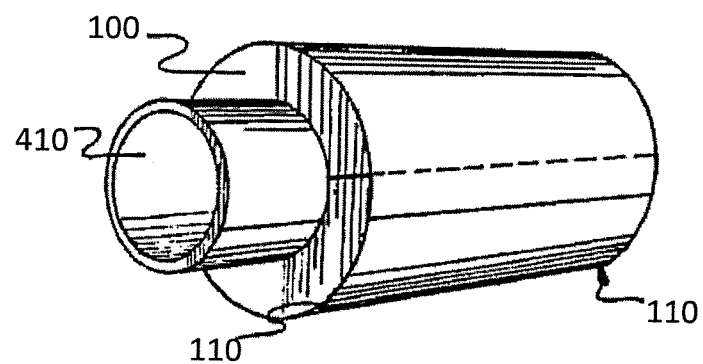
FIG. 10 is a perspective view showing the insulation jacket in a closed position about a pipe where the lip portion of the jacket has been bonded to the other longitudinal portion of the jacket.

As shown in FIG. 7, in an exemplary embodiment, the butt sealant strip (600) can be wrapped circumferentially around the jacket (110) and the butt sealant strip (600) is held in place by the closing adhesive (210). When the butt sealant strip (600) is removed as shown in FIG. 8, the extended lip portion (200) is exposed. As shown in FIGS. 9-10, the longitudinally extending slit (400) is used to place the tubular insulation (100) over a length of pipe, thus mounting the insulation to the pipe (410). After the tubular insulation (100) and jacket (110) are placed over the pipe (410), the longitudinal slit (400) is then closed using the lip portion (200), removing the internal release liner (130) in the lip portion (200) and exposing the adhesive (420). The extended lip portion (200) is then secured to the jacket (110), thus securing the insulation assembly to the pipe (410).

Figure 11:
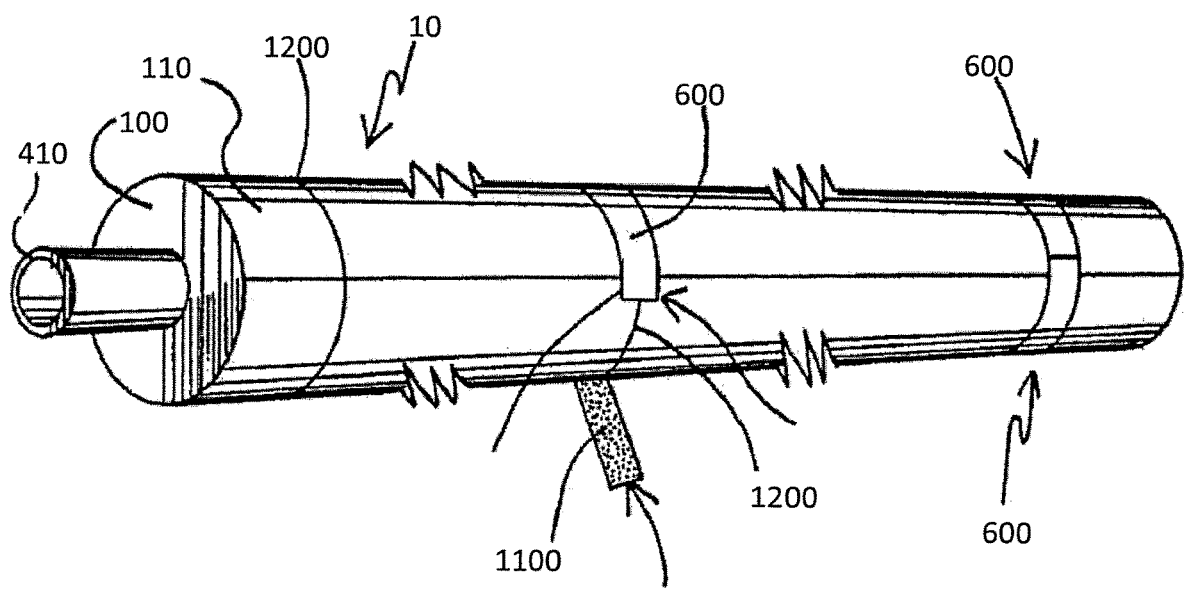
FIG. 11 is a perspective view showing several sections of the pipe insulation jacket around a pipe in various stages of butt interconnection using butt sealant strips.
Figure 12:
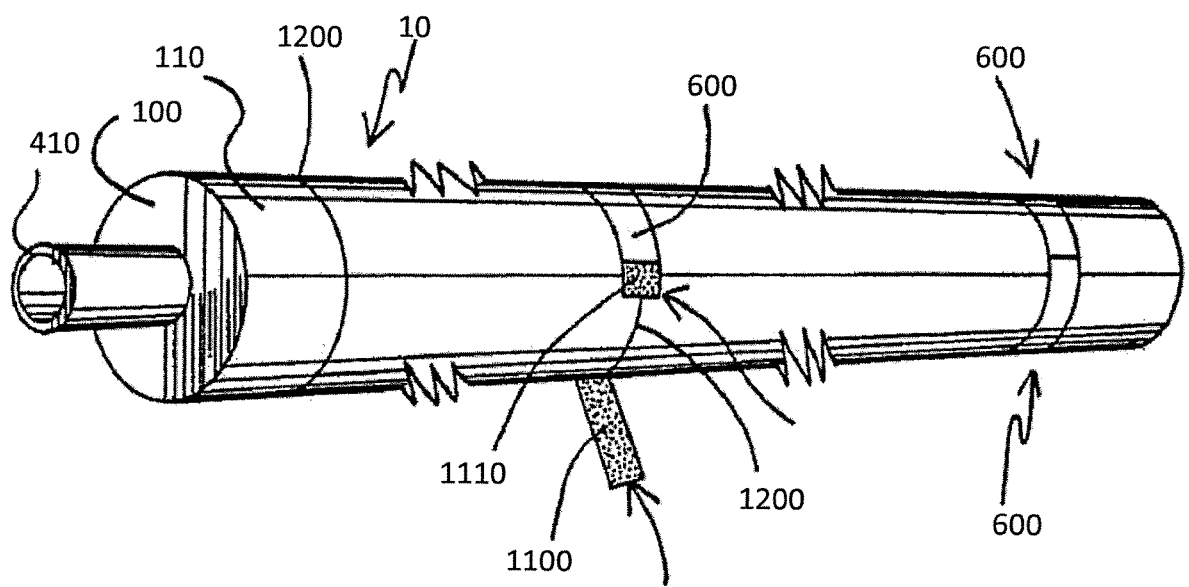
FIG. 12 is a perspective view showing several sections of the pipe insulation jacket around a pipe in various stages of butt interconnection using butt sealant strips.
Figure 13:
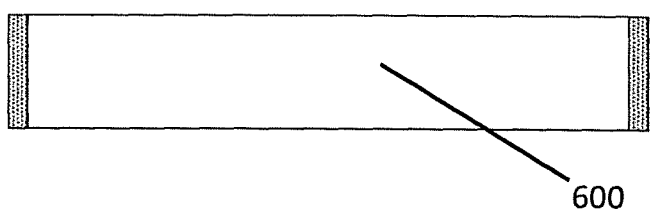
FIG. 13 is a front view of a modified butt sealant strip.

Referring now to FIG. 11, several pipe insulation assemblies may be aligned to fit the length of a single pipe. Several butt sealant strips (600) can be used in the conventional manner to seal the spaces (1200) between two adjacent pipe insulation assemblies. Referring now to FIG. 11, the butt sealant strip (600) may have adhesive on an inside portion (1100). The adhesive can be used to seal the inside portion (1100) to any other portion of the butt sealant strip. Referring now to FIG. 12, the adhesive may be located on an inside portion (1100) and another portion of the butt sealant strip, including an opposing end (1110) of the butt sealant strip.

Figure 14:
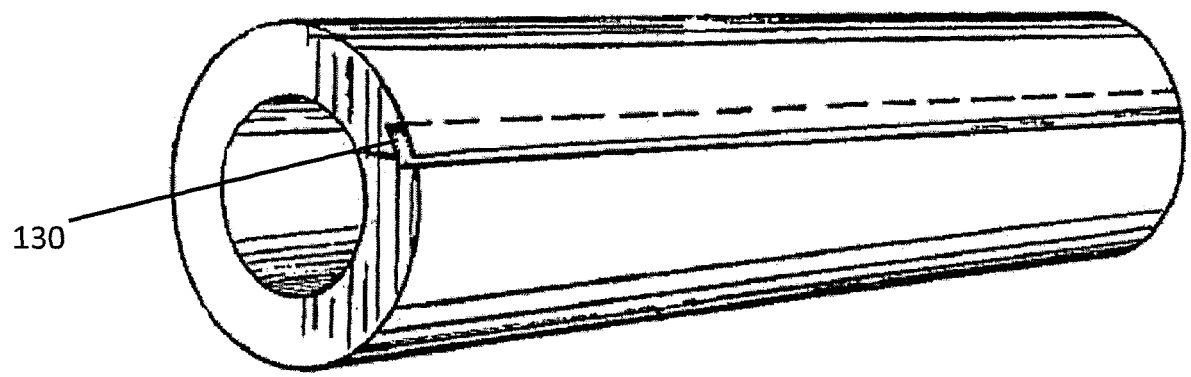
FIG. 14 is a partial perspective view showing the pipe insulation assembly.
Figure 15:
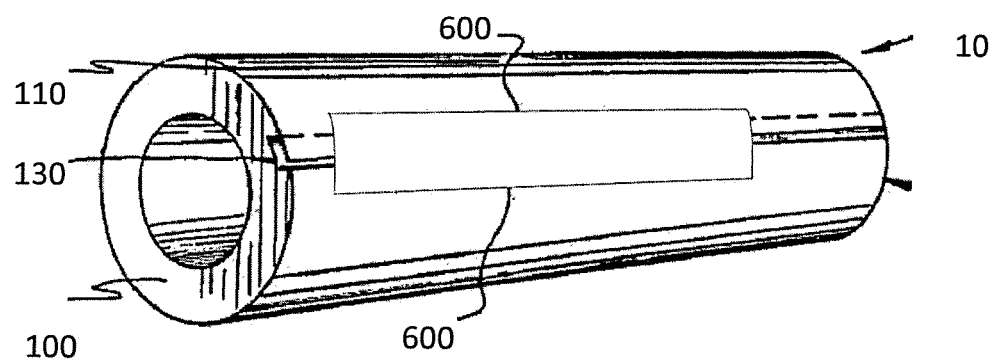
FIG. 15 is a perspective view showing the pipe insulation assembly having a longitudinally applied butt sealant strip.
Figure 16:
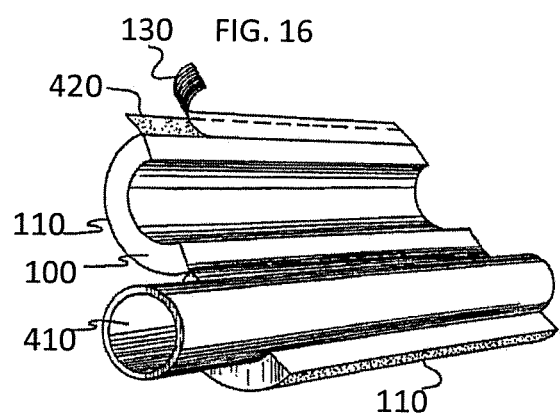
FIG. 16 is a perspective view showing the pipe insulation assembly in an open position with a pipe in one section thereof, an exposed lip adhesive and the partial removal of the internal release liner in a lip portion of the jacket.
Figure 17:
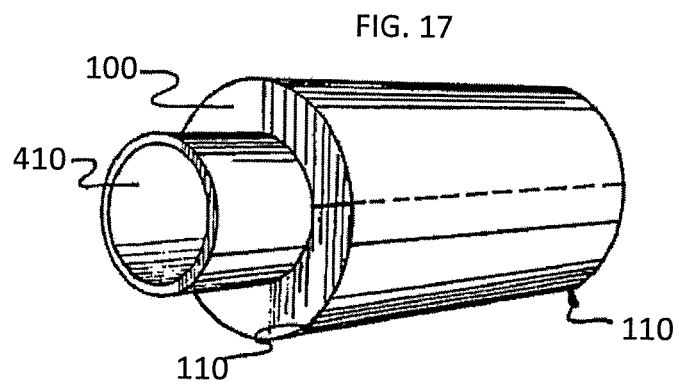
FIG. 17 is a perspective view showing the insulation jacket in a closed position about a pipe where the lip portion of the jacket has been bonded to the other longitudinal portion of the jacket.
Figure 18:
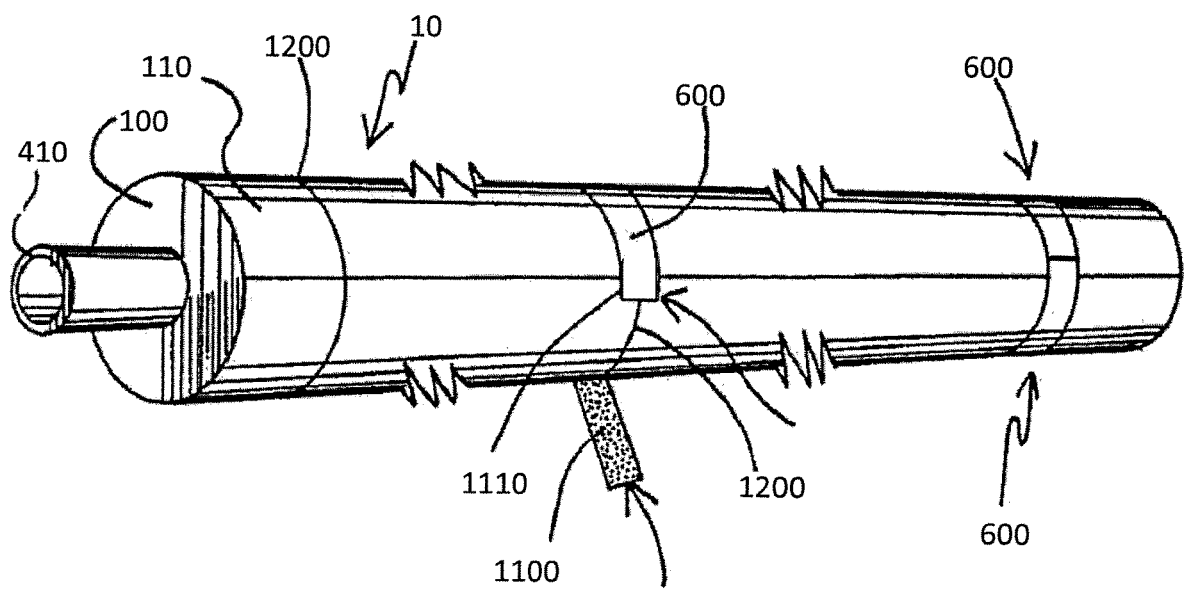
FIG. 18 is a perspective view showing several sections of the pipe insulation jacket around a pipe in various stages of butt interconnection using butt sealant strips.
Figure 19:
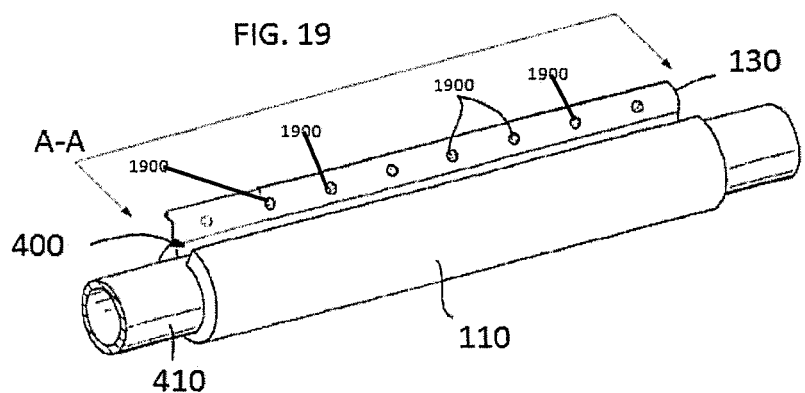
FIG. 19 is a perspective view of another embodiment of a pipe insulation assembly according to the present invention.

Referring now to FIGS. 13-18, in an exemplary embodiment, the butt sealant strip is applied longitudinally over at least part of the lip portion and the closing adhesive (210) attaches the butt sealant strip (600) to the jacket (110). As illustrated in FIG. 14, in an exemplary embodiment a closing adhesive or the adhesive already present on a conventional butt sealant strip may be placed on opposing ends of the butt sealant strip (600). As illustrated in FIG. 15, in an exemplary embodiment the butt sealant strip (600) may be placed longitudinally on the lip portion of the jacket, providing a temporary bond to close the pipe insulation assembly. When the butt sealant strip (600) is removed, the extended lip portion (200) is exposed. As shown in FIGS. 16-17, the longitudinally extending slit (400) is used to place the tubular insulation (100) over a length of pipe, thus mounting the insulation to the pipe (410). After the tubular insulation (100) and jacket (110) are placed over the pipe (410), the longitudinal slit (400) is then closed using the lip portion (200), removing the internal release liner (130) in the lip portion (200) and exposing the adhesive (420). The extended lip portion (200) is then secured to the jacket (110), thus securing the insulation assembly to the pipe (410). Referring now to FIG. 18, several pipe insulation assemblies may be aligned to fit the length of a single pipe. Several butt sealant strips can be used in the conventional manner to seal the spaces (1200) between two adjacent pipe insulation assemblies. The adhesive may be located on an inside portion (1100) and/or another portion of the butt sealant strip, including an opposing end (1110) of the butt sealant strip.

Figure 20:
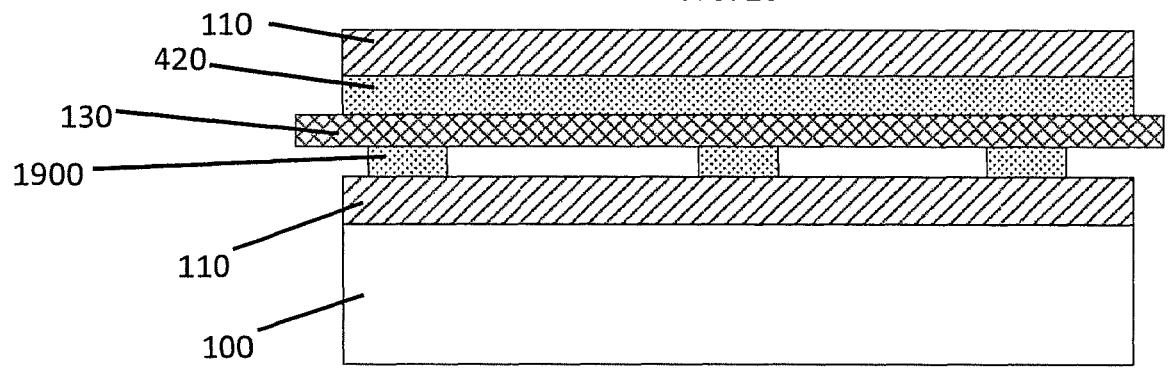
FIG. 20 is a cross-section view from line A-A of FIG. 19 when the lip portion is closed.
Figure 21:
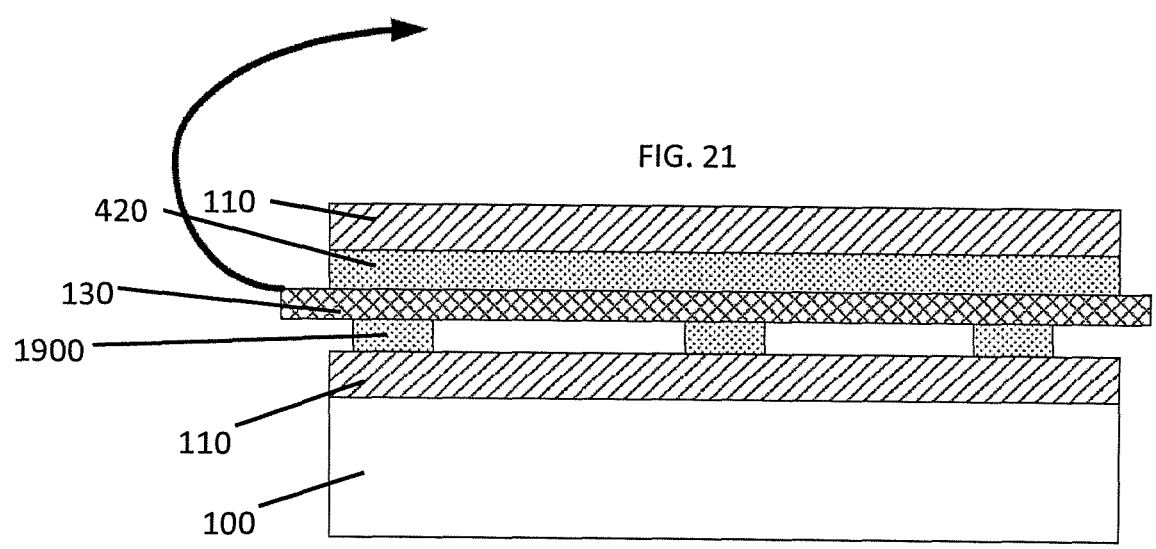
FIG. 21 is a cross-section view from line A-A of FIG. 19 when the lip portion is closed.
Figure 22:
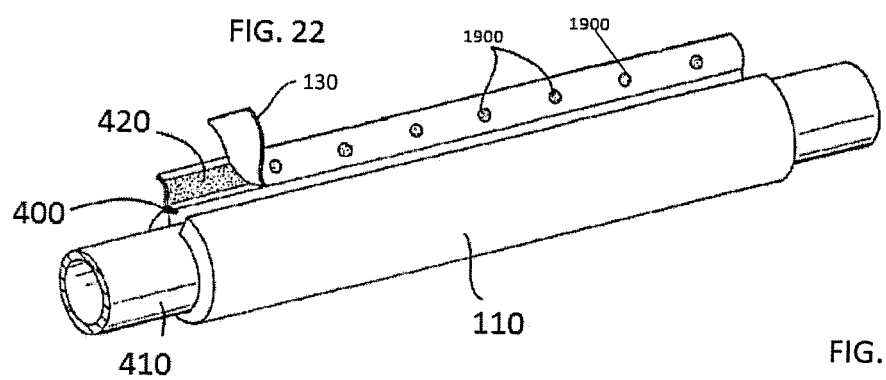
FIG. 22 is a perspective view of the pipe insulation assembly of FIG. 19.
Figure 23:
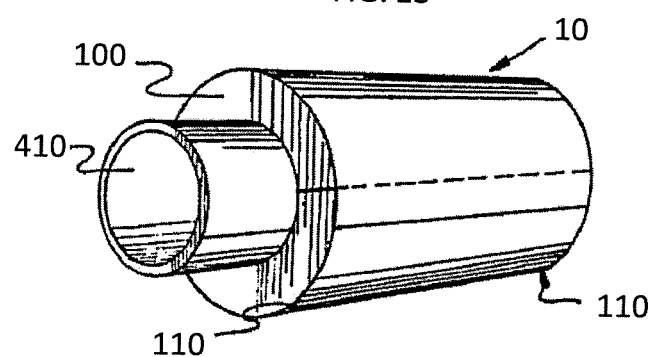
FIG. 23 is a perspective view showing the insulation jacket in a closed position about a pipe where the lip portion of the jacket has been bonded to the other longitudinal portion of the jacket.
Figure 31:
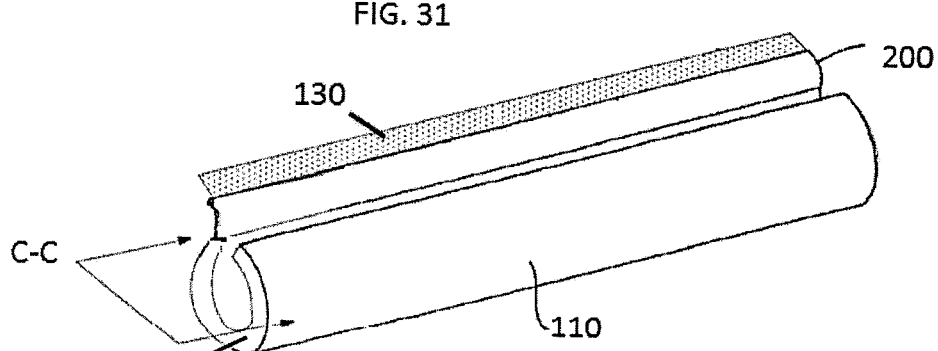
FIG. 31 is a perspective view of another embodiment of a pipe insulation assembly according to the present invention.

Referring now to FIGS. 19-23, in an exemplary embodiment, the pipe insulation assembly comprises tubular insulation (100) having a longitudinal slit (400), a jacket (110) overlaying the outer surface of the tubular insulation (100), and at least one bead or dot (1900) of adhesive (210) located on the internal release liner (130). The jacket (110) has an extended lip portion (200) extending beyond the longitudinal slit (400). The adhesive (210) may be made from many varieties of materials, including APAO or PA Hot Melt spot welded on a non-silicone coated release. A side of the extended lip portion (200) is coated with an adhesive (420). An internal release liner (130) covers the adhesive (420). Referring now to FIG. 20 that shows a schematic of an exemplary embodiment, wherein the pipe insulation assembly is viewed from the perspective of line A-A when the lip portion is temporarily closed. The internal release liner (130) is coated with an adhesive (420) on a first side between the internal release liner (130) and the jacket (110). The opposing side of the internal release liner (130) has at least one bead or dot (1900) of adhesive (210) between the outside of the jacket (110) and the tubular insulation (100). As illustrated in FIGS. 21-23, the release liner (130) and the at least one bead or dot (1900) of adhesive (210) can be removed, leaving the outside of the jacket (110) and the adhesive (420) behind. After the tubular insulation (100) and jacket (110) are placed over the pipe (410), the longitudinal slit (400) is then closed using the lip portion (200) and the exposed adhesive (420). The extended lip portion (200) is then secured to the jacket (110), thus securing the insulation assembly to the pipe (410).

Referring now to FIGS. 24-27, in an exemplary embodiment, the pipe insulation assembly comprises tubular insulation (100) having a longitudinal slit (400), a jacket (110) overlaying the outer surface of the tubular insulation (100), and an adhesive (210). The jacket (110) has an extended lip portion (200) extending beyond the longitudinal slit (400). A side of the extended lip portion (200) is coated with an adhesive (420) and an internal release liner (130) covers the adhesive (420). An adhesive (210) is located on the extended lip portion (200) and is adjacent to the internal release liner (130) such that the closing adhesive (210) contacts the jacket 110 as shown in FIG. 25 or contacts the tubular insulation (100) when the jacket (110) is closed. The closing adhesive (210) may be made from many varieties of materials, including APAO or PA Hot Melt applied to the foil side of the jacket at the inside edge of the SSL FLE.

Referring now to FIG. 25 that shows a schematic of an exemplary embodiment, wherein the pipe insulation assembly is viewed from the perspective of line B-B when the lip portion is closed. The internal release liner (130) is coated with an adhesive (420) on a first side between the internal release liner (130) and the jacket (110). However, the lip portion of the jacket extends beyond the internal release liner. The extended portion (2500) of the jacket (110) has adhesive (210) that bonds between extended portion (2500) of the jacket (110) and the outside of the jacket (110). As illustrated in FIGS. 26-27, the release liner (130) and the closing adhesive (210) can be removed, leaving the outside of the jacket (110) and the adhesive (420) behind. After the tubular insulation (100) and jacket (110) are placed over the pipe (410), the longitudinal slit (400) is then closed using the lip portion (200) and the exposed adhesive (420). The extended lip portion (200) is then secured to the jacket (110), thus securing the insulation assembly to the pipe (410).

Referring now to FIGS. 28-30, in an exemplary embodiment, the pipe insulation assembly comprises tubular insulation (100) having a longitudinal slit (400), a jacket (110) overlaying the outer surface of the tubular insulation (100), an adhesive (420) located on a side of the extended lip portion (200), and an internal release liner (130) partially covering the adhesive (420) leaving a portion of the adhesive (420) exposed. The jacket (110) has an extended lip portion (200) extending beyond the longitudinal slit (400). The exposed portion of the adhesive (420) contacts an opposing end of the jacket (110) when the jacket (110) is closed. The adhesive may be exposed in a variety of different ways, including folding back the ends of the release liner to temporarily attach the adhesive to the jacket. As illustrated in FIGS. 29-30, the release liner (130) can be removed, leaving the outside of the jacket (110) and the adhesive (420) behind. After the tubular insulation (100) and jacket (110) are placed over the pipe (410), the longitudinal slit (400) is then closed using the lip portion (200) and the exposed adhesive (420). The extended lip portion (200) is then secured to the jacket (110), thus securing the insulation assembly to the pipe (410).

Figure 32:
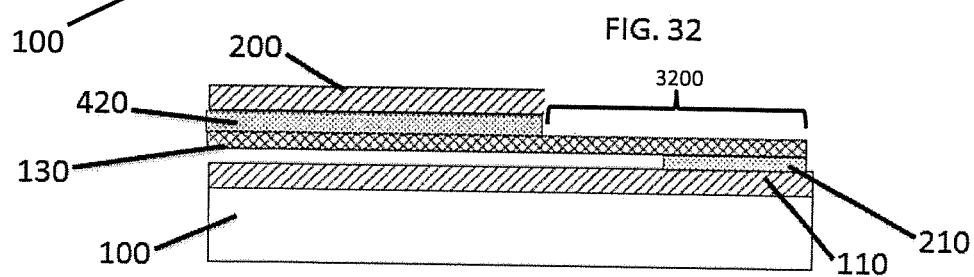
FIG. 32 is a cross-section view from line C-C of FIG. 31 when the lip portion is closed.
Figure 33:
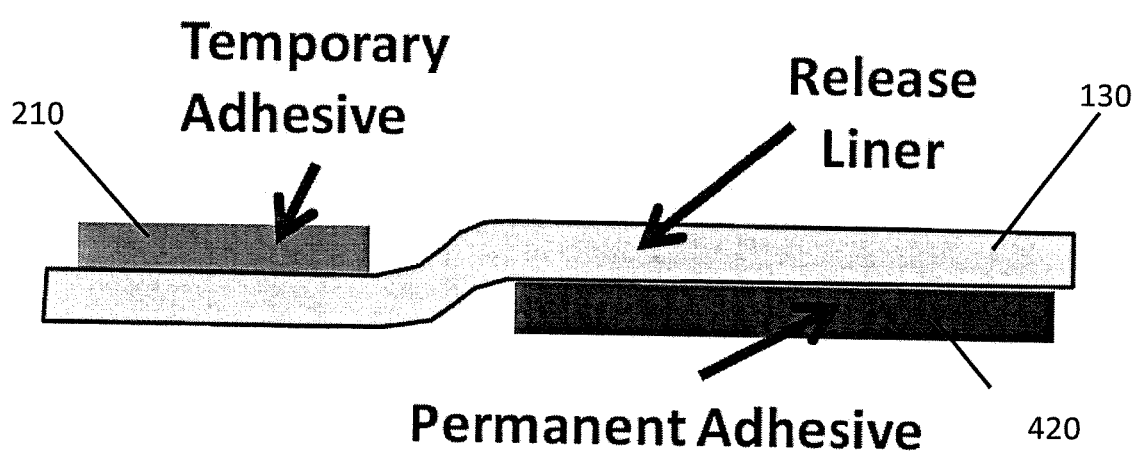
FIG. 33 is a schematic of the adhesive in one embodiment of the invention.
Figure 36:
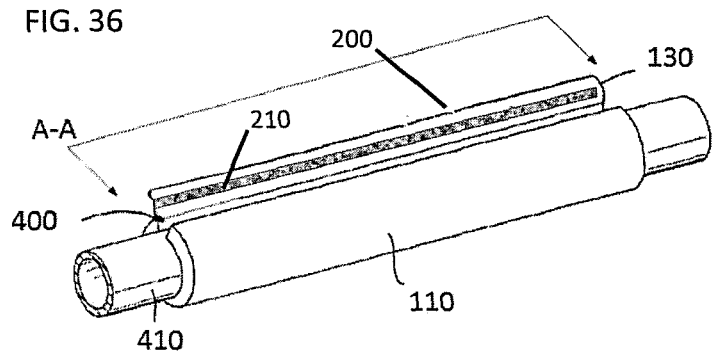
FIG. 36 is a perspective view of another embodiment of a pipe insulation assembly according to the present invention.

Referring now to FIGS. 31-35, in an exemplary embodiment, the pipe insulation assembly comprises tubular insulation (100) having a longitudinal slit (400), a jacket (110) overlaying the outer surface of the tubular insulation (100), an internal release liner (130) attached to the extended lip portion (200) and positioned so that a portion of the internal release liner reaches beyond the extended lip portion (200), an adhesive (420) located on a side of the internal release liner (130) that is attached to the extended lip portion (200), and a closing adhesive (210) located on a second side of the second lip (3200). The jacket (110) has an extended lip portion (200) extending beyond the longitudinal slit (400). An edge of the internal release liner (130) is adjacent to an edge of the extended lip portion (200) forming a second lip. Referring now to FIG. 32 that shows a schematic of an exemplary embodiment, wherein the pipe insulation assembly is viewed from the perspective of line C-C in FIG. 31 when the lip portion is closed. The internal release liner (130) is coated with an adhesive (420) on a first side between the internal release liner (130) and the extended lip portion (200). However, the internal release liner extends beyond the lip portion of the jacket forming the second lip (3200). The second lip (3200) has closing adhesive (210) between the second lip (3200) and the outside of the jacket (110). As illustrated in FIG. 33, in an exemplary embodiment, the internal release liner (130) has closing adhesive (210) on one side and adhesive (210), which can be a permanent adhesive on the opposing side. As illustrated in FIGS. 34-35, the release liner (130) and the closing adhesive (210) can be removed, leaving the outside of the jacket (110) and the adhesive (420) behind. After the tubular insulation (100) and jacket (110) are placed over the pipe (410), the longitudinal slit (400) is then closed using the lip portion (200) and the exposed adhesive (420). The extended lip portion (200) is then secured to the jacket (110), thus securing the insulation assembly to the pipe (410).

In an exemplary embodiment, a first side of the second lip is exposed when the jacket (110) is closed.

In an exemplary embodiment, the exposed first side of the second lip has dimensional markings (140) and/or angle markings that are visible outside the jacket (110) when the jacket (110) is closed.

Referring now to FIGS. 36-40, in an exemplary embodiment, the pipe insulation assembly comprises tubular insulation (100) having a longitudinal slit (400), a jacket (110) overlaying the outer surface of the tubular insulation (100), and closing adhesive (210) located on the internal release liner (130), rather than on the jacket (110). The jacket (110) has an extended lip portion (200) extending beyond the longitudinal slit (400). The closing adhesive (210) may be made from many varieties of materials, including APAO or PA Hot Melt spot welded on a non-silicone coated release liner. A side of the extended lip portion (200) is coated with an adhesive (420). One side of the internal release liner (130) covers the adhesive (420). Thus, the adhesive (420) contacts a first side of the internal release liner (130). The closing adhesive (210) is locate on an opposing side of the release liner (130).

Figure 37:
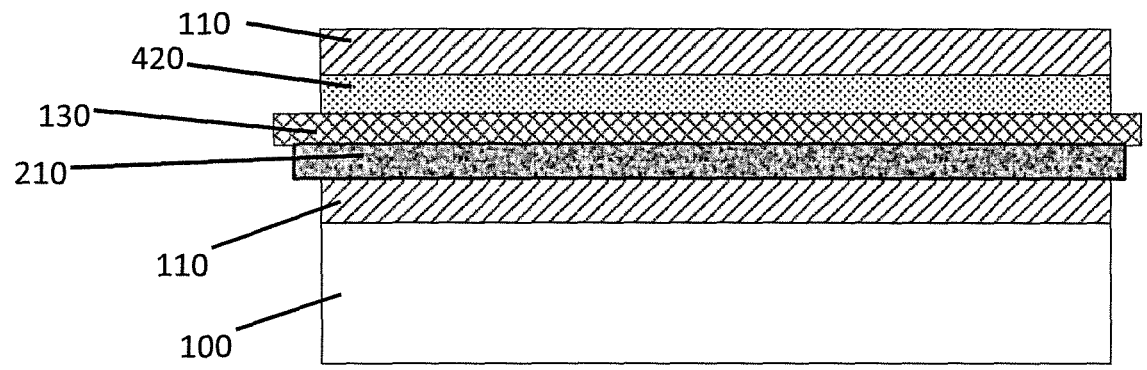
FIG. 37 is a cross-section view from line A-A of FIG. 36 when the lip portion is temporarily closed.

Referring now to FIG. 37 that shows a schematic of an exemplary embodiment, wherein the pipe insulation assembly is viewed from the perspective of line A-A when the lip portion is temporarily closed. A first side of the internal release liner (130) covers the adhesive (420) preventing the adhesive (420) from contacting the jacket (110). The opposing side of the internal release liner (130) has closing adhesive (210).

Figure 38:
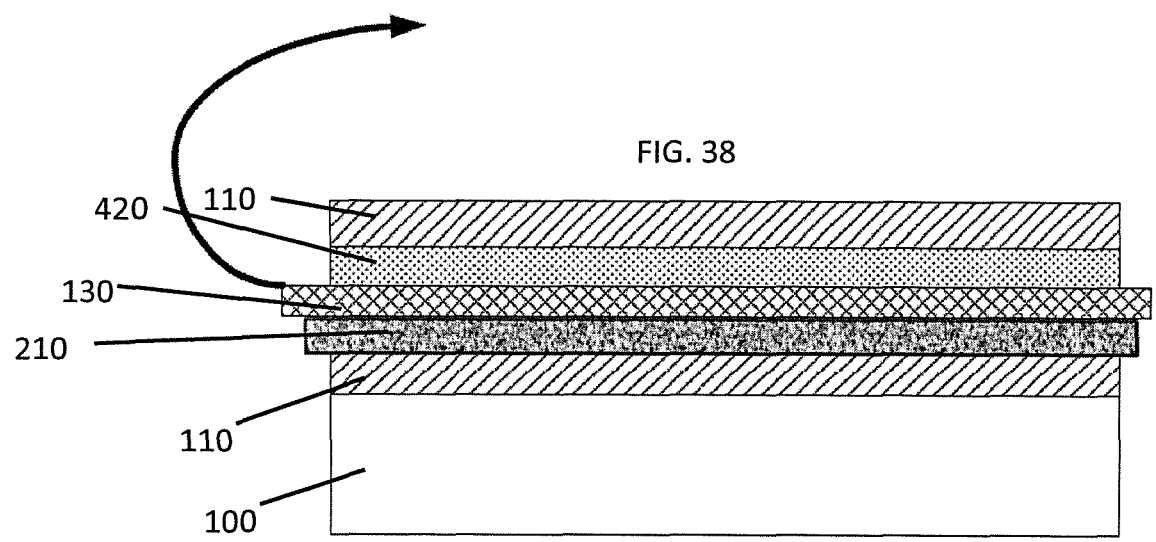
FIG. 38 is a cross-section view from line A-A of FIG. 36 illustrating the removability of a release liner and closing adhesive.

As illustrated in FIGS. 38-40, the release liner (130) and the closing adhesive (210) can be removed, leaving the outside of the jacket (110), the extended lip portion (200), and the adhesive (420) behind. All or substantially all of the closing adhesive (210) is removed from the jacket when the release liner (130) is removed. Removing all or substantially all of the of the closing adhesive (210) prevents any contaminants (i.e., fibers, dust, dirt, etc.) that may have accumulated on the closing adhesive 210 from becoming a part of the seal when the tubular insulation (100) is installed on a pipe (410). After the tubular insulation (100) and jacket (110) are placed over the pipe (410), the longitudinal slit (400) is then closed using the lip portion (200) and the exposed adhesive (420). The extended lip portion (200) is then secured to the jacket (110), thus securing the insulation assembly to the pipe (410).

The embodiments were chosen and described to illustrate the principles of the invention and its practical application. It is clear that modifications and variations are within the scope of the invention as determined by the appended claims. The drawings and preferred embodiments do not and are not intended to limit the ordinary meaning of the claims in their fair and broad interpretation in any way.

What is claimed is:
1. A pipe insulation assembly comprising:
   tubular insulation having a longitudinal slit;
   a jacket overlaying the outer surface of the tubular insulation, wherein the jacket has an extended lip portion extending beyond the longitudinal slit, wherein a side of the extended lip portion is coated with a continuous strip of a first adhesive and a first side of an internal release liner covers the first adhesive; and a continuous strip of a second adhesive located on a second side of the internal release liner,
wherein a width of the continuous strip of the first adhesive is greater than a width of the continuous strip of the second adhesive.

2. The pipe insulation assembly of claim 1, wherein substantially all of the second adhesive is removed from the jacket when the release liner is removed from the pipe insulation assembly.

3. A pipe insulation assembly comprising:
tubular insulation having a longitudinal slit;
a jacket overlaying the outer surface of the tubular insulation, wherein the jacket has an extended lip portion extending beyond the longitudinal slit;
a first adhesive located on the extended lip portion, wherein the first adhesive is located between the extended lip portion and the jacket;
a second adhesive located on the extended lip portion, wherein the second adhesive is located between the extended lip portion and the jacket; and
an internal release liner located between the first adhesive and the jacket, wherein the internal release liner covers the first adhesive,
wherein each of the first adhesive and the second adhesive contacts the extended lip portion, and
wherein a gap separates the first adhesive and the second adhesive.

4. A pipe insulation assembly comprising:
tubular insulation having a longitudinal slit;
a jacket overlaying the outer surface of the tubular insulation, wherein the jacket has an extended lip portion extending beyond the longitudinal slit;
an internal release liner attached to the extended lip portion and positioned so that a portion of the internal release liner reaches beyond the extended lip portion, wherein an edge of the internal release liner is adjacent to an edge of the extended lip portion forming a second lip;
a first adhesive located on a first side of the internal release liner that is attached to the extended lip portion; and
a second adhesive located on a second side of the internal release liner on the second lip.

5. The pipe insulation assembly of claim 4, wherein a first side of the second lip is exposed when the jacket is closed.

6. The pipe insulation assembly of claim 5, wherein the exposed first side of the second lip has dimensional markings that are visible outside the jacket when the jacket is closed.

7. The pipe insulation assembly of claim 6, wherein the dimensional markings are made using an invisible ink.

8. The pipe insulation assembly of claim 4, wherein dimensional markings are placed directly on the jacket and are made using an invisible ink.

9. The pipe insulation assembly of claim 1, wherein the continuous strip of the first adhesive extends a length of the extended lip portion.

10. The pipe insulation assembly of claim 1, wherein the continuous strip of the second adhesive extends a length of the extended lip portion.

11. The pipe insulation assembly of claim 3, wherein a thickness of the second adhesive is greater than a thickness of the first adhesive.

12. The pipe insulation assembly of claim 3, wherein the second adhesive is closer to an end of the extended lip portion furthest from the longitudinal slit than the first adhesive.

* * * * *